3,470,141
ACRYLONITRILE COPOLYMERS
Jenö Szita, Heinrich Rinkler, Herbert Marzolph, and Günther Nischk, Dormagen, Germany, assignors to Farbenfabriken Bayer Aktiengesellschaft, Leverkusen, Germany, a German corporation
No Drawing. Filed Jan. 23, 1967, Ser. No. 610,809
Claims priority, application Germany, Feb. 2, 1966, F 48,320
Int. Cl. C08f 15/40, 15/22
U.S. Cl. 260—78.5        6 Claims

ABSTRACT OF THE DISCLOSURE

Acrylonitrile polymers containing at least 70% acrylonitrile having improved affinity for basic dyes, good thermal stability, and low gelation are prepared by incorporating 0.5 to 20% by weight of the monomers of a copolymerizable, unsaturated oxalic acid amide hydrazide sulfobetaine into the polymer by copolymerization.

---

This invention relates to acrylonitrile copolymers containing sulfobetaines groups and to a method of producing said acrylonitrile copolymers showing a high affinity for basic dyes coupled with significant advantages in dyeability.

Filaments and yarns produced from acrylonitrile homopolymers and copolymers with neutral comonomers lack the affinity for dyes required for practical purposes. Accordingly, it is extremely difficult to impart a dark shade to them by dyeing with basic and acid dyes. The reason for this lies in the deficiency or absence of dye-receptive groups in the polymer. Several proposals for modifying acrylonitrile polymers have already been put forward with a view to overcoming these drawbacks.

It has already been proposed to copolymerise acrylonitrile with basic comonomers such as for example vinyl pyridine and its derivatives. Although it has been possible in this way to increase dyeability with acid dyes, other properties such as degree of whiteness, thermal stability and affinity for basic dyes are detrimentally affected.

In order to improve dyeability with basic dyes, copolymers were prepared with co-components containing carboxyl groups such as acrylic and methacrylic acid or itaconic acid. Unfortunately, these polymers show a particularly marked tendency to discolour at elevated temperatures.

Although receptivity to basic dyes could be increased by incorporating comonomers with sulpho groups in the polymer, the known processes are still unsatisfactory in many respects from the commercial point of view. Sodium methallyl- and allyl sulphonates can only be copolymerised with acrylonitrile in low yields, and only a fraction of the comonomers used is incorporated into the polymer. This disadvantage also attends the copolymerisation of acrylonitrile with N-monosubstituted acrylamide derivatives containing sulpho groups such as N-acryloyl taurine or N-acryloyl-p-aminophenylmethane sulphonic acid. The vinyl benzene sulphonic acids often used as comonomers for acrylonitrile are difficult to obtain in adequate purity on a large scale.

The textile industry occasionally requires acrylonitrile copolymers with a relatively high sulpho group content, for example in cases where it is desired to obtain filaments with a reversible swellability in water. The products spun from polymer such as these are attended by the common disadvantage that their saturation values and absorption rates with respect to basic dyes are excessively high on account of the large number of strongly acid groups present in them. Such properties present considerable difficulties in the dyeing industry as far as the equality of dyeing is concerned. Another disadvantage is that, after they have been dyed, fibre materials such as these undergo a marked increase in their swellability.

It is also known that unsaturated compounds with betaine or sulphobetaine groups can be polymerised together with acrylonitrile. Unfortunately, the affinity of the copolymers for basic dyes is not improved to any appreciable extent.

It is an object of the present invention to provide acrylonitrile copolymers consisting of at least 70% by weight of acrylonitrile compounds, using singly or together with an other comonomer 0.5% to 20% by weight of a copolymerisable, oxalid acid amide hydrazide sulfobetaine.

A further object of the invention is a method of producing acrylonitrile copolymers with an acrylonitrile content of at least 70% showing a much greater affinity for basic dyes and advantageous dyeing properties, coupled with satisfactory thermal stability and a low gelation tendency by copolymerising acrylonitrile together with 0.5 to 20% of unsaturated copolymerisable oxalamidohydrazide sulphobetaines, if desired together with further monomers.

The unsaturated oxalamidohydrazide sulphobetaines correspond to the formula

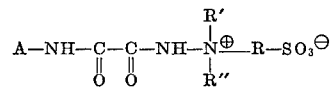

in which A represents an aliphatic, aromatic or araliphatic radical with an unsaturated copolymerisable group, R represents an alkylene radical, whilst R' and R" represent lower alkyl radicals or together with the quaternised nitrogen represent a heterocyclic radical.

One particular advantage of the process according to the invention is that the acrylonitrile copolymers or the products obtained from them such as films, fibres and filaments show unexpected, particularly favourable dyeing properties. The absorption rate and saturation value in respect of basic dyes can be adjusted via the pH-value of the dye bath in the acid range, or displaced during dyeing by altering the pH. It is possible in this way to create optimum conditions for light and dark dyeing in fibre materials with a high saturation value, by suitably controlling the pH, or to obtain a high degree of uniformity in the case of dark-shade dyeing. In partciular, such a process can facilitate the overdyeing and blended-fabric dyeing in dark shades of polyacrylonitrile yarns in combination with other types of fibre, for example with wool using acid dyes on the wool. The copolymers according to the invention are easy to prepare. Polymerisation is not affected by the comonomers and good yields can be obtained. Highly concentrated spinning solutions can be prepared from them which show a reduced tendency towards gelation and which can be spun quite easily by known processes. The comonomers incorporated according to the invention have a marked stabilising effect against discolouration at elevated temperatures, both in solution and after forming. The spun filaments and fibres exhibit outstanding physical properties, even where the comonomer content is relatively high. Their abrasion resistance is significantly increased, whilst their improved hydrophilic and antistatic properties remain intact, even after they have been dyed.

The following unsaturated oxalamidohydrazide-sulphobetaines are mentioned as example of co-monomers:

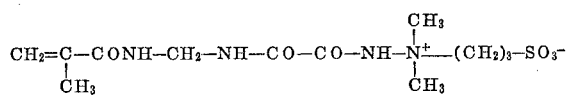

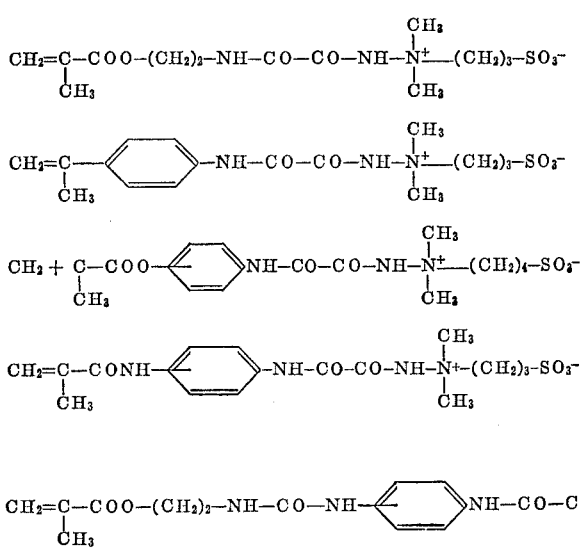

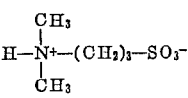

According to one of our earlier proposals, these compounds can be prepared by quaternising unsaturated N,N-disubstituted oxalamidohydrozides, for example with propane- or butane sultone. The unsaturated oxalamidohydrazidesulphobetaines in question are colourless solids. Most of them are readily soluble in water and can still be dissolved in methanol and ethanol. They can be polymerised with the aid of known catalysts, preferably in aqueous medium either individually or together with other co-polymerisable unsaturated compounds.

The copolymers with acrylonitrile according to the invention contain between 0.5 and 20%, preferably between 1 and 10%, of the compounds with oxalamidohydrazidesulphobetaine groups.

Copolymerisation may also be carried out in the presence of other unsaturated compounds which can be co-polymerised with acrylonitrile. Comonomers such as these are inter alia acrylates and methacrylates, vinyl esters, styrene and its derivatives, vinyl chloride, vinylidene chloride, butadiene, chloroprene, acryl- and methacrylamides, vinylalkyl ketones, divinyl compounds incl vinylidene cyanide, as well as comonomers with a basic character such as vinyl pyridine and its derivatives.

It is possible by including a third comonomers such as, for example, methyl methacrylate, methyl acrylate, vinyl acetate or N-tert.-butylacrylamide, in the copolymers further to improve the dyeing properties of the fibres in some cases. The copolymers according to the invention can contain between 2 and 10% of these comonomers.

Acrylonitrile can be copolymerised with the oxalamidohydrazide sulphobetaines and, if desired, with other monomers by known polymerisation processes, for example in emulsion, dispersion or solution. Conventional emulsifiers such as salts of fatty acids, alkyl or aryl sulphonates and non-ionic emulsifiers may be used in the case of emulsion polymerisation. Solution polymerisation can be carried out in aqueous, concentrated salt solutions such as zinc chloride solution or solutions of inorganic thiocyanates, and in organic solvents such as dimethyl formamide, dimethyl sulphoxide, ethylene glycol carbonate or butyrolactone, in the presence of radical catalysts, for example azo compounds, peroxides or Redox systems which are able to initiate the polymerisation reaction.

It is preferred, however, to carry out polymerisation in aqueous solution in the absence of emulsifiers, using radical forming catalysts or catalyst systems such as for example hydrogen peroxide, organic hydroperoxides, alkyl peroxides, ketoperoxides, acylperoxides and persulphates, as well as azo compounds such as azodiisobutyronitrile. In general, however, Redox systems are preferred, particularly those based on per compounds and sulphur compounds of low oxidation states. Although water-soluble salts of peroxydisulphuric acid, such as sodium, potassium or ammonium persulphate, are preferably used as per compounds in the Redox system, perborates, perphosphates, perchlorates and chlorates would among other compounds also be suitable. The following sulphur compounds with low oxidation states are highly effective reduction components: sulphur dioxide, alkali-metal hydrosulphites, alkal-metal pyrosulphites and alkali-metal thiosulphates and the corresponding ammonium salts.

A Redox system of potassium or sodium sulphate and potassium or sodium hydrogen sulphite or pyrosulphite is preferably used as catalyst in the preparation of the copolymers according to the invention. The Redox system is generally used in a quantity of between 0.5 and 5%, based on the total weight of the monomers. The ratio between oxidation and reduction component can be between 4:1 and 1:50 although it is preferably between 1:2 and 1:10. Heavy metal ions in the form of their salts may be added in small quantities (1 to 1000 p.p.m.) in order further to activate the Redox system. Sulphates, chlorides or nitrates of bivalent iron and copper are particularly effective. In addition to the salts used as Redox catalysts, suitable neutral salts such as inter alia alkali-metal sulphates, phosphates, may also be present in the polymerisation mixture. If desired, radical-reactive substances, the so-called regulators such as mercaptans for example, and compounds with a complex-forming character such as for example metaphosphoric acid, oxalic acid and ethylene diamine tetracetic acid or their salts, may also be used in the process according to the invention.

Polymerisation is carried out either continuously or batchwise in the usual way. The water used as polymerisation medium is employed in approximated 50 to 10 times the quantity of the monomers used. The reaction temperature is between $+10$ and $+70°$ C., preferably between 40 and 55° C. The pH-value of the reaction medium is between 2 and 6, preferably between 2.5 and 4. Concentrated inorganic acids such as sulphuric acid or phosphoric acid, or organic acids such as arylsulphonic acids, are used to adjust the pH-value. Polymerisation is preferably carried out in an inert-gas atmosphere, for example nitrogen although it could also be carried out in the presence of air. On completion of polymerisation, the copolymers which are formed in the form of fine grains, are usually separatestd from the liquid phase by filtration of centrifuging, washed neutral with salt water and dried at reduced pressure or in a current of hot air. The polymers to be used for fibre usually have K-values (according to Fikentscher Cellulosechemie 13, 1932, page 58) of between 75 and 110, preferably between 80 and 90.

The parts and percentages given in the description and the following examples which are intended to illustrate the invention represents parts by weight and percentages by weight, respectively, based on the total quantity, unless otherwise indicated.

EXAMPLES 1–10

The polymerisation tests were carried out in a glass reaction vessel equipped with stirring mechanism, contact thermometer, nitrogen inlet and reflux condenser. Each reaction mixture consisted of 930 ml. of desalted water, 70 g. of acrylonitrile and a predetermined quantity of an unsaturated sulphobetaine. Potassium persulphate and sodium pyrosulphite were used as the catalysts. The pH of the reaction mixture was adjusted to 3.5 with 20% sulphuric acid. The reaction was carried out at 50° C. in a protective nitrogen atmosphere (50–10 mm. Hg) and lasted 4 hours. The white polymer precipitated was filtered off, washed neutral with desalted water and dried in vacuo at 60–70° C.

Various sulphobetaine comonomers according to the invention were copolymerised with acrylonitrile in this way. The comonomers used and the quantities in which they were present in the monomer mixture, the quantities of catalyst, the yields obtained and the K-values of the polymers (according to Fikentscher, Cellulosechemie 13, p. 58, 1932) are set out in the following Table 1.

Formulae of comonomers I–IV:

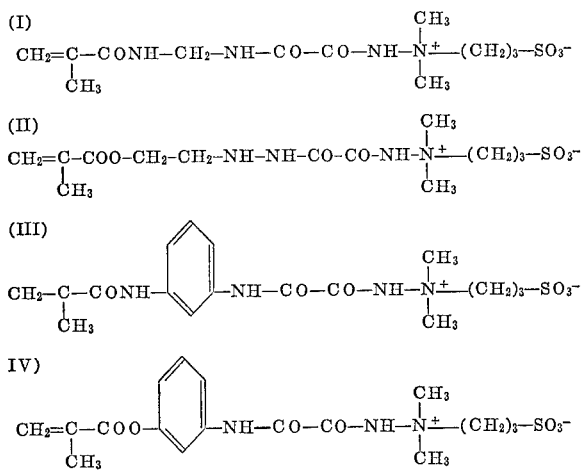

lows: 1 g. of polymer is dissolved in 100 ml. of distilled dimethyl formamide which has been treated with a mixed-bed ion exchange resin (Merck Type V). Approximately 10 cm.³ of this mixed-bed ion exchange resin are introduced into the solution which is then stirred for 30 minutes to one hour. The solution is then filtered off and 50 ml. of it titrated with an $n/100$ KOH-solution in methanol. A pH meter of the kind manufactured by Messrs. Knick (Type 52, calomel glass electrode) was used as the measuring instrument. The results of measurement are given in milliequivalents of acids groups/100 g. of polymers (mVal. acid gr./100 g. PM) in Table 3.

The increased affinity of the aforementioned copolymers for basic dyes can be demonstrated very simply by dyeing films. For this purpose, films approximately 50μ-thick were cast from approximately 15% dimethyl formamide solutions. After having been dried in vacuo at 60° C., for some 24 hours, the films were washed with hot water until they were free from solvent, and then dried. The films thus prepared were dyed as follows with the basic dye Asteazonblau B (color Index 2nd edit., vol. III, No. 42140):

Composition of the dye bath:

| | g./1 |
|---|---|
| 100 ml. of Astrazonblau B-solution | 1 |
| 2 ml. of acetic acid | 30 |
| 0.3 ml. of sodium acetate | 40 |

The dye is dissolved in boiling water, filtered and measured out whilst still hot. Approximately 0.5 to 1 g. of film is added at a dye bath temperature of 80° C. and dyed for 1 hour after the boiling temperature has been reached. The films thus dyed were thoroughly washed with water, and then dried.

In order to determine quantitatively the amount of dye absorbed, the dyed films are carefully dissolved in dimethyl formamide containing 1 g./l. of sulphuric acid. Determination was carried out by measuring the extinction values at wave-length of 625 mμ (absorption maximum of the dye) with the aid of a spectral photometer and a calibration curve (extinction, g./l. of dye).

The results are set out in the following Table 3 (g. of dye×100/g. of film):

TABLE 1

| Example No. | Comonomer Type* | Percent by weight | Catalysts $K_2S_2O_8$(g.) | $Na_2S_2O_5$(g.) | Conversion (percent) | K-value |
|---|---|---|---|---|---|---|
| 1 | I | 8 | 0.55 | 2.2 | 85 | 84.2 |
| 2 | II | 1 | 0.5 | 2.0 | 86 | 85.5 |
|   | AME | 5 |   |   |   |   |
| 3 | II | 4 | 0.5 | 2.0 | 81 | 87.4 |
| 4 | II | 8 | 0.5 | 2.0 | 79 | 85.4 |
| 5 | III | 1 | 0.5 | 2.0 | 87 | 84.8 |
|   | AME | 5 |   |   |   |   |
| 6 | III | 2.5 | 0.5 | 2.0 | 84 | 85.8 |
| 7 | III | 8 | 0.5 | 2.0 | 86 | 84.6 |
| 8 | IV | 2.5 | 0.55 | 2.2 | 93 | 84.7 |
| 9 | IV | 8 | 0.65 | 2.6 | 95 | 85.2 |
| 10 | None (comparison) |   | 0.5 | 2.0 | 86 | 87.8 |

¹ AME—methyl acrylate.

In order to examine the tendency of the copolymers according to the invention to discolour in dimethyl formamide solution at elevated temperatures, 5% polymer solutions were tempered at 80° C. in the presence of air. After 2, 4 and 20 hours, respectively, the extinction values of the solutions were measured by means of an electrophotometer (Type Elko–III, manufactured by Zeiss) at a wavelength of 470 mμ (thickness of cell=5 cm., comparison solution pure dimethyl formamide). The results are set out in the following Table 2:

TABLE 2

| Polymer of Example No. | Extinction after— 2 hours | 4 hours | 20 hours |
|---|---|---|---|
| 1 | 0.210 | 0.300 | 0.340 |
| 2 | 0.320 | 0.390 | 0.570 |
| 3 | 0.335 | 0.405 | 0.430 |
| 4 | 0.137 | 0.195 | 0.195 |
| 5 | 0.340 | 0.400 | 0.590 |
| 6 | 0.330 | 0.420 | 0.560 |
| 7 | 0.310 | 0.390 | 0.540 |
| 8 | 0.223 | 0.290 | 0.685 |
| 9 | 0.167 | 0.220 | 0.408 |
| 10 (comparison) | 0.340 | 0.540 | 1.120 |

The copolymers according to the invention prepared in accordance with Examples 1 to 10 contain acid groups which can be measured precisely for example by potentiometric titration. Measurement was carried out as fol-

TABLE 3

| Polymer of Example No. | mVal. acid gr./ 100 g. of PM | G. of dye/g. of film×100 |
|---|---|---|
| 1 | 17.8 | 3.27 |
| 2 | 5.3 | 0.61 |
| 3 | 14.8 | 1.26 |
| 4 | 22.7 | 3.90 |
| 5 | 5.8 | 0.69 |
| 6 | 11.0 | 0.94 |
| 7 | 23.2 | 4.26 |
| 8 | 12.4 | 1.02 |
| 9 | 22.6 | 3.65 |
| 10 | 2.3 | 0.27 |

The fact that dyeability is governed by the pH can be demonstrated by dyeing films obtained from the same polymer in dye baths with different pH values. Films obtained from polymers Nos. 4 and 7 were each dyed in 100 ml. of 0.16% Astrazonblau B-solutions with different pH-values which were adjusted as follows:

| | pH |
|---|---|
| With 10% $H_2SO_4$ | 1.5 |
| | 2.0 |
| | 2.5 |
| | 3.0 |
| | 3.5 |
| With 3% $CH_3COOH$ | 4.0 |
| | 5.0 |
| With 4% $CH_3COONa$-solution | 6.0 |

Dyeing, and determination of the quantities of dye absorbed, were carried out as described above. The results are set out in the following Table 4:

TABLE 4

| | G. of dye/g. of film×100 | |
|---|---|---|
| pH-value | Polym. No. 4 | Polym. No. 7 |
| 1.5 | 0.46 | 0.87 |
| 2.0 | 1.22 | 1.47 |
| 2.5 | 1.70 | 1.85 |
| 3.0 | 2.18 | 3.47 |
| 4.0 | 3.90 | 4.26 |
| 5.0 | 4.29 | 4.40 |

What we claim is:

1. Normally solid random copolymers of acrylonitrile consisting of
   (A) at least 70% by weight of acrylonitrile;
   (B) 0.5% to 20% by weight of a copolymerizable, ethylenically unsaturated oxalic acid amide hydrazide sulfobetaine of the formula:

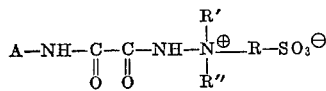

wherein A is an aliphatic, aromatic, or araliphatic radical with an ethylenically unsaturated copolymerizable group, R is an alkylene radical, R' and R'' are lower alkyl radicals or together with the quaternized nitrogen are a heterocyclic radical; and
   (C) 0 to 29.5% by weight of copolymerizable, ethylenically unsaturated monomer other than (A) and (B).

2. Acrylonitrile copolymers of claim 1, wherein said sulfobetaine is methacrylic acid ethylester-β-oxalic acid acid amide-N,N-dimethylhydrazide sulfobetaine.

3. Acrylonitrile copolymers of claim 1, wherein said sulfobetaine is methacrylic acid amide-N-phenyl-oxalic acid amide-N,-dimethylhydrazide sulfobetaine.

4. Acrylonitrile copolymers of claim 1, wherein said sulfobetaine is isopropenyl-phenyl-oxalic acid amide-N,N-dimethylhydrazide sulfobetaine.

5. A method for producing acrylonitrile copolymers comprising copolymerizing:
   (A) at least 70% acrylonitrile;
   (B) 0.5 to 20% by weight of anoxalic acid amidohydrazide sulfobetaine of the formula

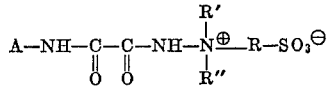

wherein A is an aliphatic, aromatic, or araliphatic radical with an ethylenically unsaturated copolymerizable group, R is an alkylene radical, and R' and R'' are lower alkyl radicals, or together with the quaternized nitrogen are a heterocyclic radical; and
   (C) 0 to 29.5% by weight of copolymerizable, ethylenically unsaturated monomer different from A) and B); the copolymerization being carried out in aqueous medium at pH values between 2 and 6 with Redox systems based on persulphate and sulphur compounds of low oxidation states.

6. The method of claim 5, wherein methyl acrylate or vinyl acetate is used as the (C1) comonomer.

References Cited

UNITED STATES PATENTS

| 3,256,252 | 6/1966 | Kruckenberg et al. |
| 3,260,707 | 7/1966 | Caldwell et al. |

FOREIGN PATENTS

| 1,475,980 | 2/1967 | France. |

JAMES A. SEIDLECK, Primary Examiner

U.S. Cl. X.R.

260—79.3